Dec. 22, 1970   R. L. HOOVER   3,548,667
TORQUE TRANSFER GEAR CASE WITH A DISENGAGEABLE POWER TAKEOFF
Filed June 12, 1969   3 Sheets-Sheet 3
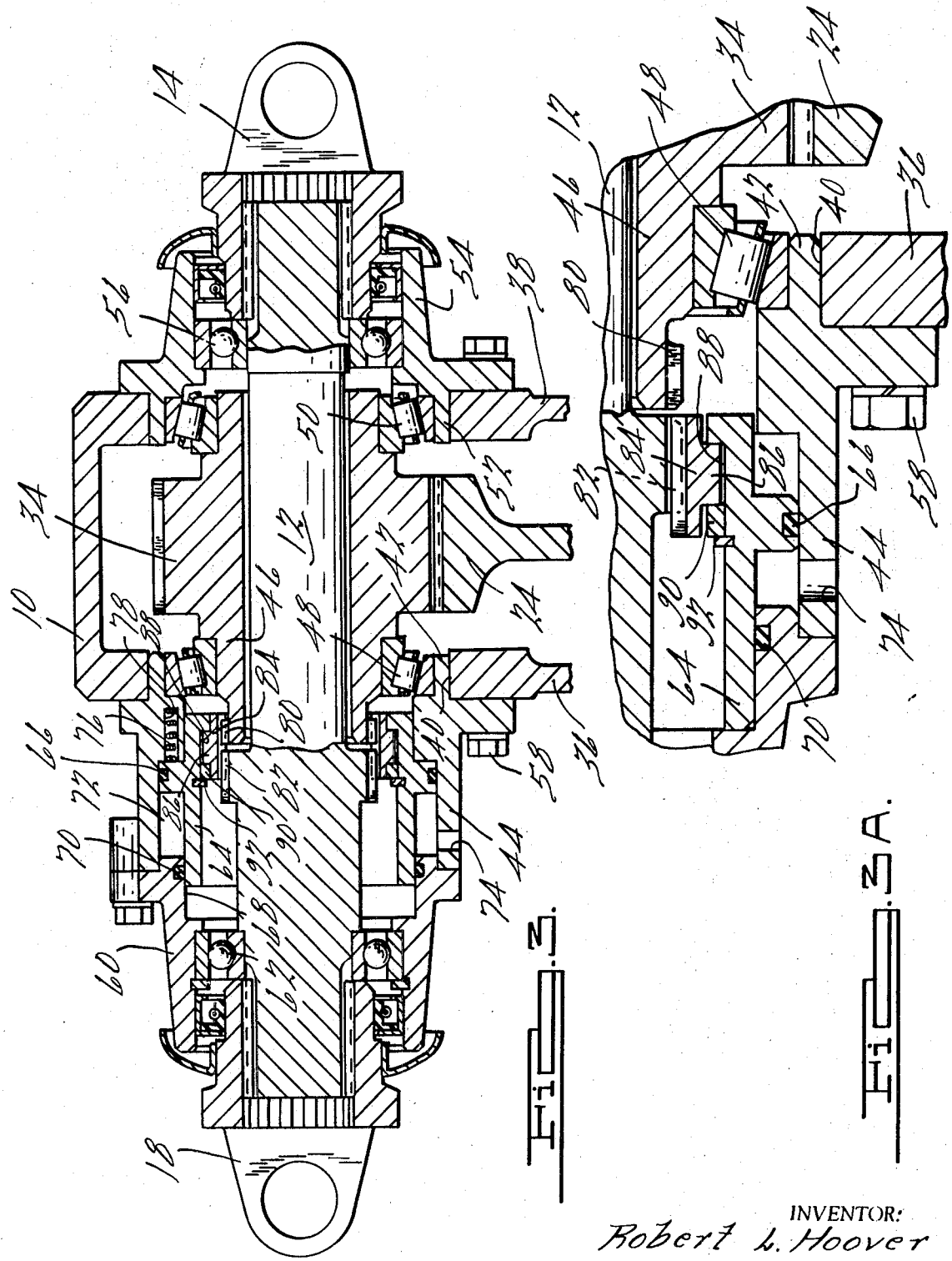
INVENTOR:
Robert L. Hoover
BY
ATTORNEYS

United States Patent Office 3,548,667
Patented Dec. 22, 1970

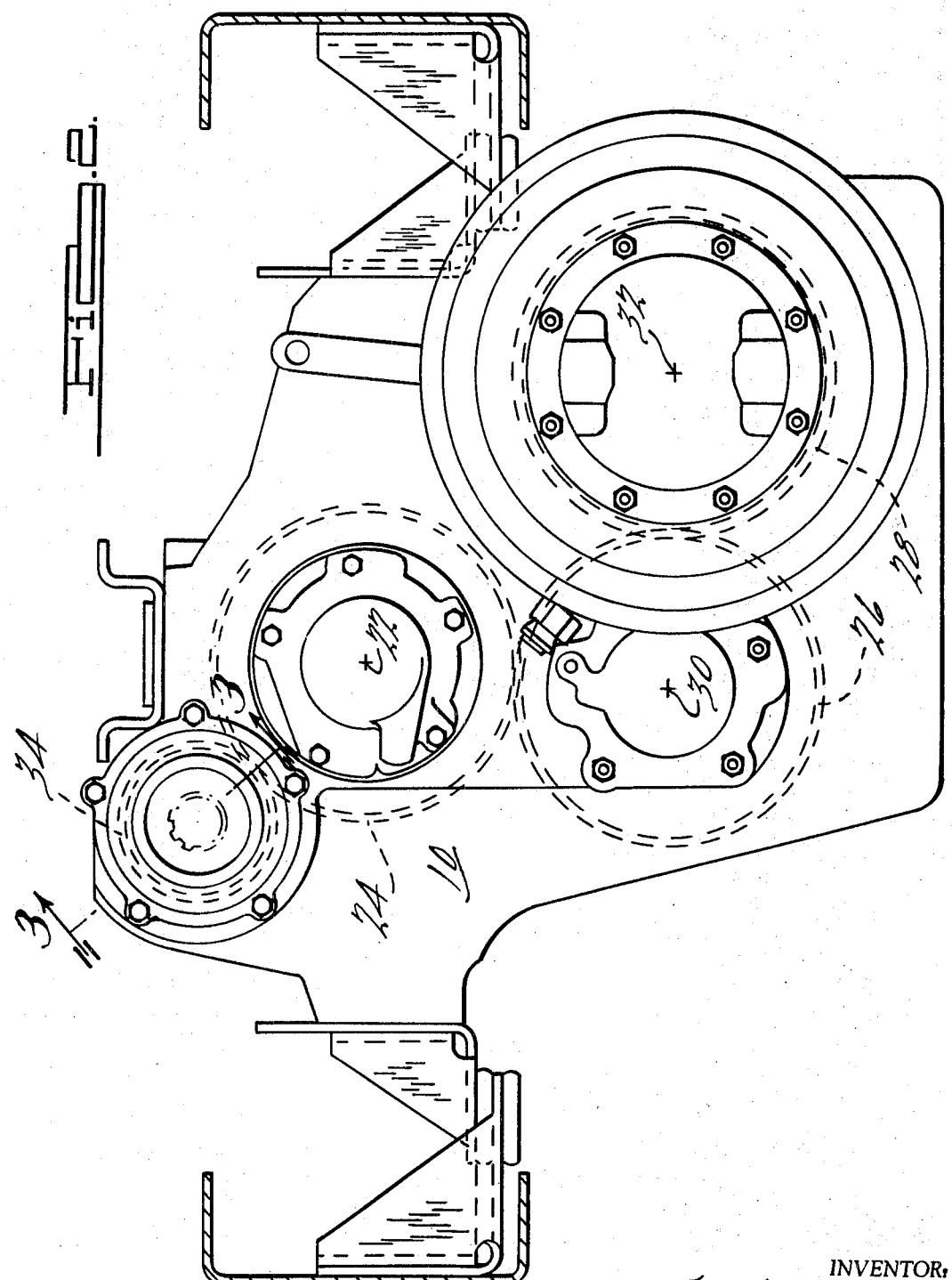

3,548,667
TORQUE TRANSFER GEAR CASE WITH A DISENGAGEABLE POWER TAKEOFF
Robert L. Hoover, Royal Oak, Mich., assignor to Ford Motor Company, Dearborn, Mich., a corporation of Delaware
Filed June 12, 1969, Ser. No. 832,685
Int. Cl. F16h 37/00
U.S. Cl. 74—15.86    4 Claims

ABSTRACT OF THE DISCLOSURE

A torque transfer gear case for use in distributing torque from the power output shaft of a multiple ratio transmission mechanism in a vehicle driveline to output drive flanges for a vehicle driveshaft, said gear case including a power take-off gear connected drivably to a driving gear and a clutch mechanism for engaging and disengaging a power takeoff shaft including a fluid motor having an annular piston concentrically positioned with respect to the power takeoff shaft and a clutch sleeve engageable with clutch elements carried by the power takeoff gear and the power takeoff shaft, said piston effecting shifting movement of said sleeve as it is shifted axially while being held fast against rotation.

BRIEF DESCRIPTION OF THE INVENTION

In torque delivery drivelines for special wheeled vehicles, such as heavy duty trucks and military vehicles, it is conventional practice to locate a multiple speed ratio transmission on one axis and to locate the driveshafts for the vehicle traction wheels at another location. A torque transfer gear case drivably connects the output shaft of the multiple ratio transmission with drive yokes which in turn establish a driving connection with the drive shafts. The improvement of my invention is useful in an environment of this type.

My invention includes a power takeoff mechanism for use with a torque transfer gear case wherein a power takeoff gear is journalled rototably in meshing engagement with one of the torque delivery gears of the gear case. A power takeoff shaft is journalled rotatably in concentric disposition with respect to the power takeoff gear. The mechanism includes drive yokes connected to either end of the power takeoff shaft which permit connections with shaft extensions by means of universal joints so that the driving torque can be utilized at a location displaced from the immediate vicinity of the engine and transmission assembly.

My improved invention includes improved clutch means for connecting and disconnecting the power takeoff gear and the associated power takeoff shafts. It includes a circular housing secured directly to the torque transfer case and which defines an annular cylinder which is concentrically disposed with respect to the power takeoff shaft. The cylinder cooperates with an annular piston to define a working pressure chamber surrounding the axis of the shaft.

A clutch sleeve is connected mechanically to the piston at the inner region of the piston. The mechanical connection permits rotation of the sleeve with respect to the piston about the axis of the power output shaft, although relative axial shifting movement of the sleeve with respect to the piston is prevented. Rotary motion of the piston itself wtih respect to the cylinder is prevented by means of a keyway or the like, although axial shifting movement is permitted.

An externally toothed clutch element is carried by the power takeoff gear; and a cooperating externally toothed clutch hub is carried by the power takeoff shaft, the teeth of the hub and the teeth of the clutch element being arranged in axial alignment.

The clutch element is formed with internal teeth which register with the teeth of the hub and with the teeth of the clutch element in sliding relationship. By controlled distribution of pressure to the working chamber of the cylinder and the piston, the clutch sleeve may be brought into engagement or disengagement.

BRIEF DESCRIPTION OF THE FIGURES OF THE DRAWINGS

FIG. 2 is a side elevation view of portions of the structure of FIG. 1.

FIG. 3 is a cross-sectional view taken along the plane of section line 3—3 of FIG. 2.

FIG. 3A is an enlarged portion of FIG. 3 to illustrate better a clutch element in the invention.

PARTICULAR DESCRIPTION OF THE INVENTION

Figure 1:
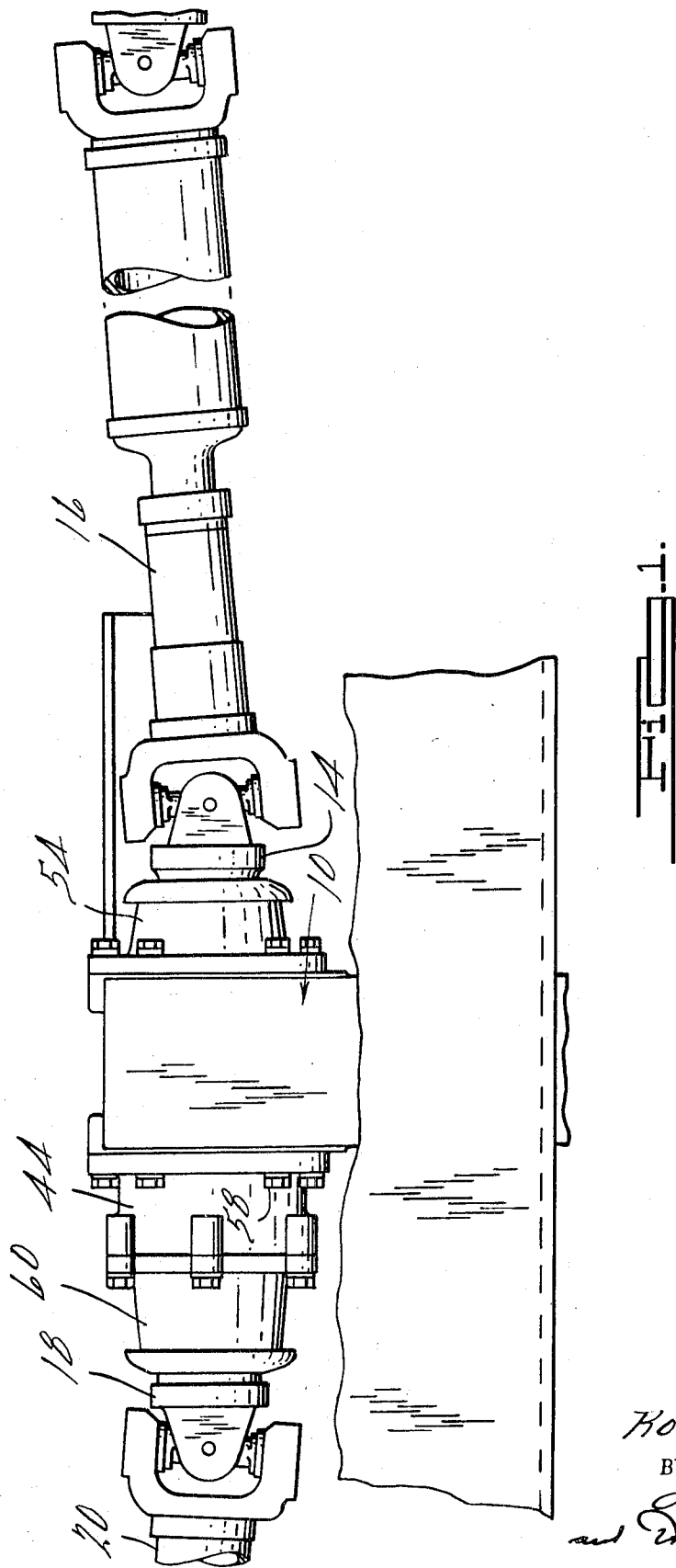
FIG. 1 is a front elevation view of a torque transfer gear case and a power takeoff assembly embodying the improvements of my invention.

In FIG. 1, numeral 10 designates the housing for a torque transfer gear case. It is formed with axial openings in its sides through which a torque delivery shaft 12 extends. One end of the shaft 12 is connected by means of universal joint 14 to a first power output shaft 16. The other end of the shaft 12 is provided with a universal joint 18 which provides a driving connection with a second power output shaft 20. A power input shaft having a center located on axis 22 of FIG. 2 extends from the housing 10. It is connected drivably to gear 24, indicated best in FIG. 3. This gear in turn is connected to torque transfer gears 26 and 28, the latter being connected drivably to a power output shaft in the vehicle driveline. The axes of rotation for the gears 26 and 28 are shown in FIG. 2 at 30 and 32, respectively.

The power output shaft assembly includes a power takeoff gear 34 which meshes directly with the power input gear 24. This is best seen in the cross-sectional view of FIG. 3. The housing 10 includes sides 36 and 38 situated in generally parallel relationship. The side wall 36 is formed with opening 40, which receives the flange 42 on cylinder 44. The hub 46 of the gear 34 is journalled within the flange 42 by means of tapered roller bearing 48. The other end of the hub 46 is journalled by means of tapered roller bearing 50 and by flange 52 formed on bearing adapter 54. This bearing adapter is secured by bolts to side wall 38.

Driven shaft 12 is journalled at one end thereof by ball bearing 56 within the adapter 54. The universal joint 14 includes a yoke, which is splined to the end of the shaft 12.

Cylinder 44 is bolted by means of bolts 58 to the side wall 36. It is provided with an end cover 60 which serves as a bearing adapter for bearing 62. This bearing journals the left-hand end of the shaft 12. The universal joint 18 includes a yoke which is splined to the left-hand end of the shaft 12.

An annular piston 64 is slidably received within the cylinder 44. It includes a peripheral seal 66 on its radially outward extremity for establishing sealing contact with the inner circular wall of the cylinder 44. An extension of this piston 64 slidably registers with cylindrical inner surface 68 in the adapter or end plate 60. A fluid seal 70 is located in the end plate 60 so that it slidably engages the piston 64.

The cylinder 44 and the piston 64 cooperate to define a pressure chamber 72, which is in fluid communication with a pressure distributor port 74. A plurality of springs 76 is located in a series of spring openings, one of which is shown at 78 in the right-hand end of the cylinder 44.

The opening 78 receives a spring 76, and the latter acts directly on the piston 64 to urge the piston in a left-hand direction.

Hub 64 is formed with an externally toothed clutch element 80. This is situated directly adjacent clutch hub 82, which has external teeth formed thereon with a pitch diameter substantially the same as the pitch diameter of the teeth of clutch element 80. A slidable clutch sleeve 84 meshes with the teeth of the hub 82 and the teeth of the clutch element 80. When the clutch element 84 is in the position shown in FIG. 3, it effectively connects the gear 34 to the shaft 12. Circular clutch element 84 includes a peripheral shoulder 86, which is received within internal annular groove 88 formed in the piston 64. The clutch element 84 is adapted to rotate with respect to the piston 64, but axial shifting movement of the clutch element 84 with respect to the piston 64 is prevented.

By preference, the groove 88 is defined in part by a bearing ring 90 which is held axially fast by snap ring 92 in the piston 64. This bearing ring engages the shoulder 86.

When fluid pressure is admitted to the chamber 72, the piston 64 and the clutch element 84 are shifted in a right-hand direction to establish clutching engagement of the hub 82 and the clutch element 80. If fluid pressure is relieved from the chamber 72, the springs 76 are effective to shift the piston 64 to a clutch disengaging position.

The piston 64 can be held against rotary motion with respect to the housing 10 by means of a suitable keyway connection between the cylinder 44 and the piston 64. The clutch element 84, however, is free to rotate with the shaft 12 regardless of whether it is in the clutch engaged position or the clutch disengaged position.

The concentric disposition of the piston 64 with respect to the shaft 12 and with respect to the cylinder 14 permits a maximum working pressure area to be formed on the piston itself. Also there are no unbalanced forces on the piston and the clutch element, and the friction incident to sliding movement of the clutch ring 84 is reduced to a minimum.

Having thus described a preferred form of my invention what I claim and desire to secure by U.S. Letters Patent is:

1. A power takeoff assembly for use with torque delivery gears in a vehicle driveline comprising a housing, said gears being journalled rotatably in said housing, a power takeoff gear journalled in said housing in meshing engagement with one of said torque delivery gears, a torque delivery shaft journalled in said housing in concentric disposition with respect to said power takeoff gear, a clutch hub formed on said shaft, a clutch element formed on said gear, said clutch hub and said clutch element having formed thereon external teeth of generally equal pitch diameter, said teeth being concentrically disposed with respect to the axis of rotation of said power takeoff gear, a fluid motor having a cylinder secured to said housing, an annular piston surrounding said shaft and slidably disposed with said cylinder, said cylinder and said piston cooperating to define a pressure chamber, a clutch sleeve having internal clutch teeth slidably engaged with the external clutch teeth of said clutch hub and said clutch element, said clutch sleeve being mounted within said piston and held axially fast therein, the connection between said sleeve and said piston accommodating relative rotation of said clutch sleeve with respect to said piston, shifting movement of said clutch sleeve into and out of engagement with respect to said external clutch teeth being effected by controlling pressure distribution to said pressure chamber.

2. The combination as set forth in claim 1 wherein said pressure chamber is formed on one side of said piston, said fluid motor comprising spring means acting upon said piston to oppose the force of the working pressure supplied to said working chamber.

3. The combination as set forth in claim 1 wherein said clutch sleeve is adapted to engage said clutch hub when said piston is shifted in one direction, said clutch sleeve being adapted to engage both said hub and said clutch element as said piston is shifted in the other direction.

4. The combination as set forth in claim 2 wherein said clutch sleeve is adapted to engage said clutch hub when said piston is shifted in one direction, said clutch sleeve being adapted to engage both said hub and said clutch element as said piston is shifted in the other direction.

References Cited
UNITED STATES PATENTS

| | | | |
|---|---|---|---|
| 2,932,202 | 4/1960 | Rinkema | 74—15.86 |
| 3,232,125 | 2/1966 | Lee et al. | 74—15.86 |

LEONARD H. GERIN, Primary Examiner